United States Patent
Liu et al.

(10) Patent No.: US 10,896,615 B2
(45) Date of Patent: Jan. 19, 2021

(54) NAVIGATION METHOD AND NAVIGATION SYSTEM IMPLEMENTING THE SAME

(71) Applicant: KWANG YANG MOTOR CO., LTD., Kaohsiung (TW)

(72) Inventors: Te-Chuan Liu, Taipei (TW); Li-Hui Chen, Taipei (TW); Chen-Sheng Lin, Kaohsiung (TW); Yi-Yang Tsai, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 198 days.

(21) Appl. No.: 16/272,896

(22) Filed: Feb. 11, 2019

(65) Prior Publication Data
US 2019/0272759 A1 Sep. 5, 2019

(30) Foreign Application Priority Data
Mar. 2, 2018 (TW) .............................. 107107001 A

(51) Int. Cl.
*G08G 1/00* (2006.01)
*G05D 1/02* (2020.01)
*G01C 21/36* (2006.01)

(52) U.S. Cl.
CPC ........... *G08G 1/22* (2013.01); *G01C 21/3661* (2013.01); *G05D 1/0295* (2013.01); *G05D 2201/0213* (2013.01)

(58) Field of Classification Search
CPC ...................................................... G08G 1/22
See application file for complete search history.

(56) References Cited

U.S. PATENT DOCUMENTS

| | | | |
|---|---|---|---|
| 6,640,164 B1* | 10/2003 | Farwell | G05D 1/0278 180/168 |
| 2003/0023370 A1* | 1/2003 | Millington | G01C 21/3626 701/411 |
| 2012/0052870 A1* | 3/2012 | Habicher | H04W 8/16 455/456.1 |
| 2014/0005941 A1* | 1/2014 | Paek | G01C 21/3415 701/533 |
| 2015/0192420 A1* | 7/2015 | Watters | G01C 21/3407 701/410 |
| 2016/0191637 A1* | 6/2016 | Memon | H04W 4/024 701/522 |
| 2017/0343360 A1* | 11/2017 | Harikrishnan | G01S 5/0027 |
| 2018/0217593 A1* | 8/2018 | Erickson | G08G 5/0013 |
| 2018/0225975 A1* | 8/2018 | Park | G08G 1/052 |
| 2019/0063941 A1* | 2/2019 | Walenty | G01C 21/362 |
| 2019/0069380 A1* | 2/2019 | Kastee | G05B 15/02 |
| 2019/0272760 A1* | 9/2019 | McQuillen | G08G 1/0968 |
| 2020/0117220 A1* | 4/2020 | Paglieroni | G08G 5/0039 |

* cited by examiner

*Primary Examiner* — Alex C Dunn
(74) *Attorney, Agent, or Firm* — Womble Bond Dickinson (US) LLP

(57) ABSTRACT

A navigation method is implemented by a group of portable devices which are associated with a map-and-information system and each of which is communicatively coupled to an instrument cluster device of a respective vehicle. The group of the portable devices includes a leader device and at least one follower device. The map-and-information system computes, for the follower device, a dynamic navigation path from the follower device to the leader device. The instrument cluster device of the vehicle that corresponds to the follower device perceivably outputs the dynamic navigation path.

10 Claims, 10 Drawing Sheets

NAVIGATION METHOD AND NAVIGATION
SYSTEM IMPLEMENTING THE SAME

CROSS-REFERENCE TO RELATED APPLICATION

This application claims priority of Taiwanese Invention Patent Application No. 107107001, filed on Mar. 2, 2018.

FIELD

The disclosure relates to a navigation method and a navigation system, and more particularly to a navigation method and a navigation system for performing navigation for a navigation device based on a real-time position of another navigation device.

BACKGROUND

When a group of people go on a trip with multiple vehicles (e.g., motorcycles, cars, or a combination thereof), the drivers of the vehicles in the group (referred to as "member drivers") may individually use navigation devices to acquire a route to the destination. For safety reasons, the member drivers may be unable to communicate with each other by phone or by social networking software while driving. If the member drivers are separated to the extent that they are unable to see each other, it would be inconvenient to gather all the member drivers again so that they can move towards the destination all together. If the member drivers do not stick together, they cannot look out for each other. In a case that an accident happens to one member driver, other member drivers may not become aware of such abnormal condition at the first instant to provide immediate assistance.

SUMMARY

Therefore, an object of the disclosure is to provide a navigation method that can alleviate at least one of the drawbacks of the prior art.

According to the disclosure, the navigation method includes: (a) providing a plurality of portable devices, each of the portable devices having a positioning function to generate a real-time position dataset that indicates a real-time position thereof, being communicatively coupled to an instrument cluster device of a respective one of vehicles, and being associated with a map-and-information system; (b) establishing, via a network and by the portable devices each of which executes an application program, a device group including a leader device and at least one follower device, wherein a first one of the portable devices is set to serve as the leader device, and each of the portable devices that is other than the first one of the portable devices is set to serve as one of the at least one follower device; (c) computing, by the map-and-information system and based on the real-time positioning dataset corresponding to the leader device and the real-time positioning dataset corresponding to the at least one follower device, data for a dynamic navigation path from the real-time position of the at least one follower device to the real-time position of the leader device; and (d) perceivably outputting, by the instrument cluster device of one of the vehicles that corresponds to the at least one follower device, the dynamic navigation path based on the data for the dynamic navigation path.

Another object of the disclosure is to provide a navigation system that can alleviate at least one of the drawbacks of the prior art.

According to the disclosure, the navigation system includes a plurality of portable devices and a map-and-information system. Each of the portable devices has a positioning function to generate a real-time position dataset that indicates a real-time position thereof, and is communicatively coupled to an instrument cluster device of a respective one of vehicles. Each of the portable devices executes an application program to establish, via a network, a device group including a leader device and at least one follower device, wherein a first one of the portable devices is set to serve as the leader device, and each of the portable devices that is other than the first one of the portable devices is set to serve as one of the at least one follower device. The map-and-information system is configured to receive the real-time positioning dataset corresponding to the leader device and the real-time positioning dataset corresponding to the at least one follower device, and to compute, based on the real-time positioning dataset corresponding to the leader device and the real-time positioning dataset corresponding to the at least one follower device, data for a dynamic navigation path from the real-time position of the at least one follower device to the real-time position of the leader device. The at least one follower device is configured to receive the data for the dynamic navigation path from the map-and-information system, and to cause the instrument cluster device of one of the vehicles that corresponds to the at least one follower device to perceivably output the dynamic navigation path based on the data for the dynamic navigation path.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
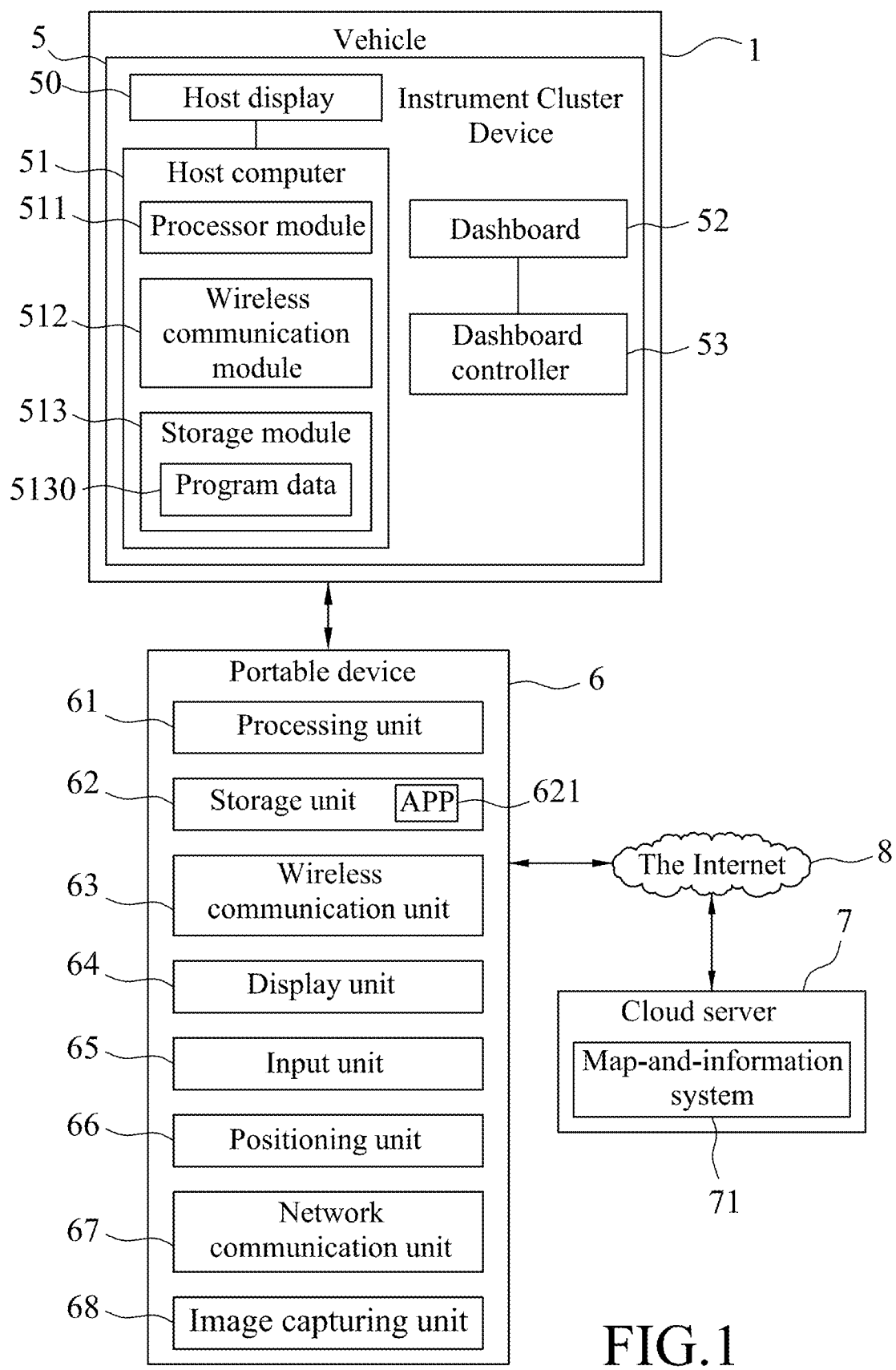
FIG. 1 is a block diagram illustrating an embodiment of a portable device of a navigation system for implementing a navigation method according to the disclosure, wherein the portable device is communicatively coupled to a map-and-information system included in a cloud server and an instrument cluster device of a vehicle.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
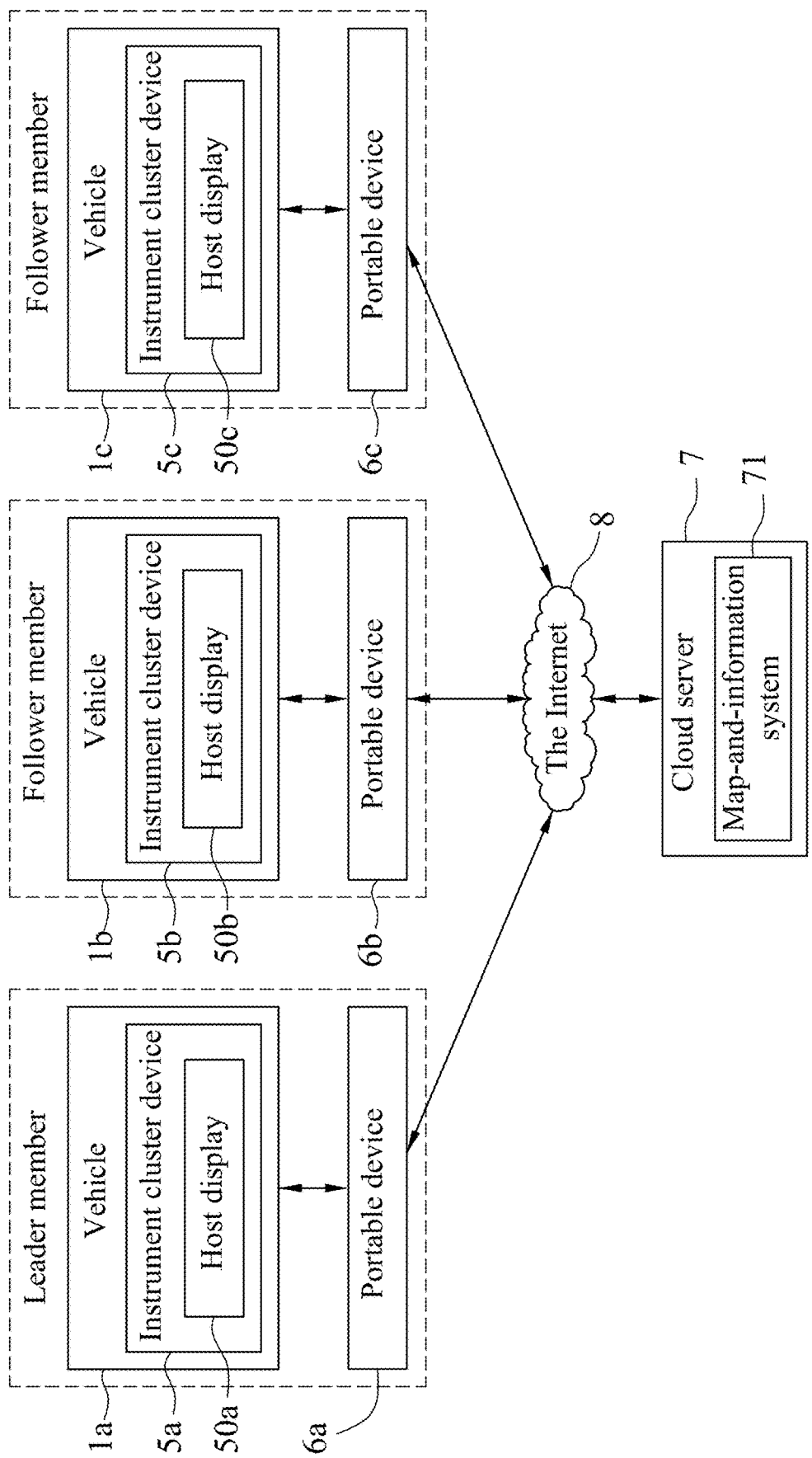
FIG. 2 is a block system illustrating an embodiment of the navigation system.
Figure 3:
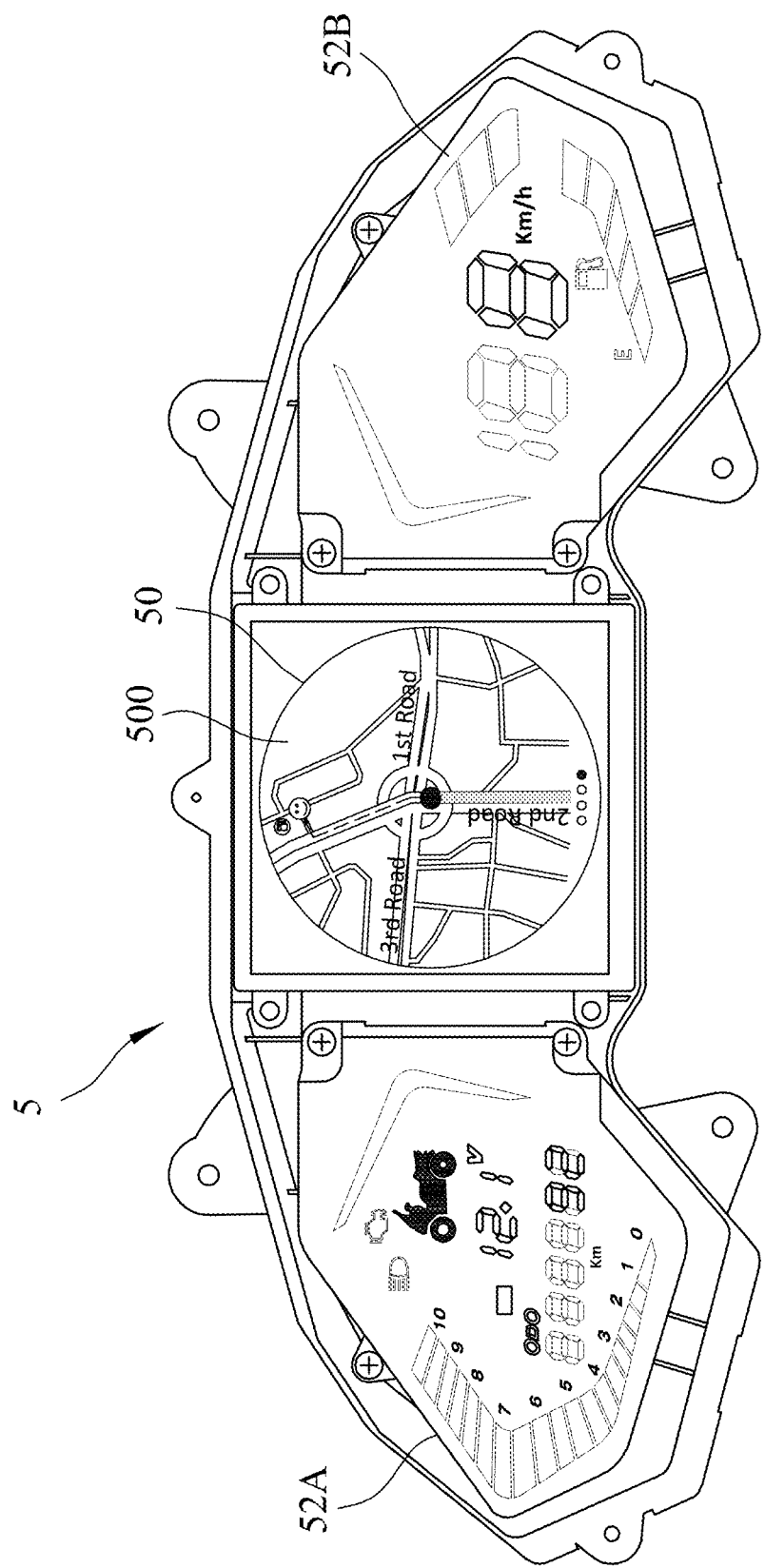
FIG. 3 is a schematic diagram illustrating the instrument cluster device that is used to output navigation information provided by the navigation system.

Referring to FIGS. 1 to 3, the embodiment of the navigation method according to this disclosure is implemented by a navigation system that includes a group of portable devices 6 (referred to as 6a, 6b and 6c in FIG. 2), and a map-and-information system 71. In this embodiment, the map-and-information system 71 is included in a cloud server 7, and each of the portable devices 6 is communicatively coupled to the map-and-information system 71. Each portable device 6 has a positioning function to generate a real-time position dataset (e.g., a set of real-time GPS (global positioning system) coordinates) that indicates a real-time position thereof and that is provided to the map-and-information system 71 for use thereby, and is communicatively coupled to an instrument cluster device 5 of a respective one of vehicles 1 (referred to as 1a, 1b and 1c in FIG. 2) driven by a group of drivers. Each of the vehicles 1 may be, for example, a motorcycle, a car, an all terrain vehicle (ATV), a utility vehicle (UV), an electric vehicle, etc.

Each portable device 6 may be, for example, a smartphone, a wearable device, a tablet computer, etc., which has a navigation function, and includes a processing unit 61 (e.g., a single-core or multi-core processor), a storage unit 62 (e.g., flash memory) for storing an application program (APP) 621 which is to be executed by the portable device 6 to perform the navigation method according to this disclosure, a wireless communication unit 63 (e.g., a Bluetooth module, a Wi-Fi module, a near field communication module) for communication with the instrument cluster device 5, a display unit 64 (e.g., a liquid crystal display (LCD), an organic light-emitting diode display), an input unit 65 (e.g., a keyboard, a touch screen, a microphone), a positioning unit 66 (e.g., a GPS device), a network communication unit 67 for connection via a network (e.g., the Internet 8) to the cloud server 7, and an image capturing unit 68 (e.g., a camera device). The processing unit 61 is electrically connected to the storage unit 62, the wireless communication unit 63, the display unit 64, the input unit 65, the positioning unit 66, the network communication unit 67 and the image capturing unit 68. In one embodiment, the display unit 64 and the input unit 65 may be integrated together to form a touch display which can display images (such as an operation interface of the APP 621) and which can receive input by touch operation of the user.

Referring to FIG. 1, in this embodiment, the instrument cluster device 5 of each vehicle 1 includes a host display 50, a host computer 51 electrically coupled to the host display 50, a dashboard 52, and a dashboard controller 53 electrically coupled to the dashboard 52.

Further referring to FIG. 3, the dashboard 52 is configured to display specific information in a dedicated format, which is set by a manufacturer of the vehicle 1, and is not arbitrarily alterable as desired by a user. The dashboard controller 53 is configured to control display of the dashboard 52. As an example, in FIG. 3, the dashboard 52 is divided into a first part 52A and a second part 52B that are respectively arranged at left and right sides of the host display 50, and is particularly configured to display instrument cluster information such as an accumulated traveling distance of the vehicle 1, a traveling distance of an individual trip, a current voltage of the battery, a current speed of the vehicle 1, a current fuel level, current tire pressures, etc., in predefined formats and arrangements. On the other hand, the host display 50 is configured as an ordinary display, such as a regular LCD, that is used to display an image based on any arbitrary image data provided by the host computer 51. For example, the host computer 51 may be operated to cause the host display 50 to display the instrument cluster information (e.g., the accumulated traveling distance of the vehicle 1, the traveling distance of an individual trip, the current voltage of the battery, the current speed of the vehicle 1, the current fuel level, the current tire pressures, etc.). The host computer 51 includes a processor module 511 (e.g., a single-core or multi-core processor), a wireless communication module 512 (e.g., a Bluetooth module, a Wi-Fi module, a near field communication module), and a storage module 513 (e.g., a hard disk drive, flash memory, etc.) for storing program data 5130, such as an operating system (OS), firmware (FW), and application programs of the host computer 51. The processor module 511 is electrically coupled to the host display 50, the wireless communication module 512, and the storage module 513. The host computer 51 is capable of pairing with and/or connected to the portable device 6 via the wireless communication module 512 thereof and the wireless communication unit 63 of the portable device 6, so that the host computer 51 can receive data from the portable device 6, and control the host display 50 to display images based on the data received from the portable device 6. For example, when the host computer 51 has been paired with and is now communicatively coupled to the portable device 6 via wireless communication, the host computer 51 may cause the host display 50 to display information like vehicle speed, current time, weather, intelligent compass, notifications, vehicle finding, etc., which may be received from the portable device 6. In other embodiments, the host computer 51 may be connected to the portable device 6 via wired connection (e.g., a USB cable), and this disclosure is not limited in this respect.

The group of drivers consists of a leader member and at least one follower member. In FIG. 2, the group of drivers is exemplified to include a leader member and two follower members. The leader member uses the portable device 6a, and drives the vehicle 1a including an instrument cluster device 5a that is communicatively connected to the portable device 6a and that has a host display 50a. The first one of the follower members uses the portable device 6b, and drives the vehicle 1b including an instrument cluster device 5b that is communicatively connected to the portable device 6b and that has a host display 50b. The second one of the follower members uses the portable device 6c, and drives a vehicle 1c including an instrument cluster device 5c that is communicatively connected to the portable device 6c and that has a host display 50c.

Figure 4:
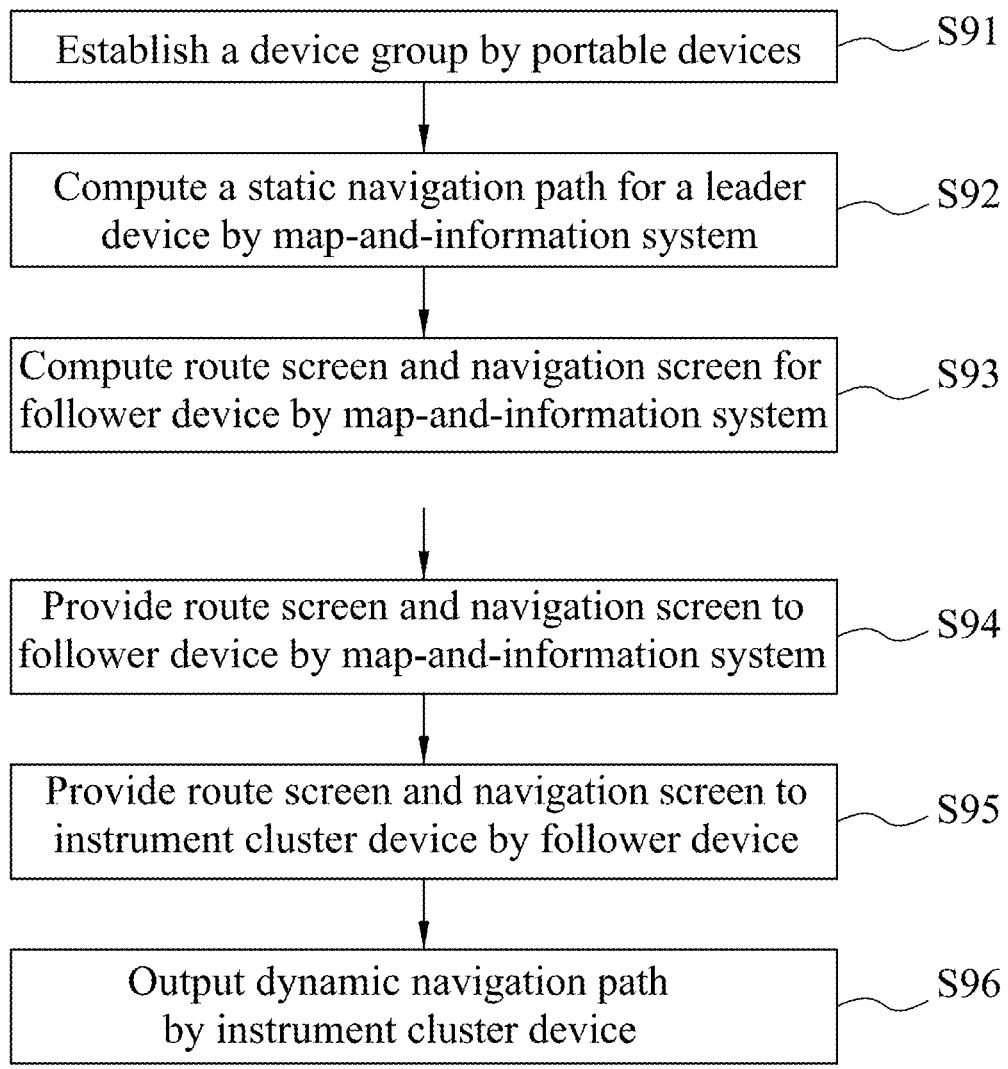
FIG. 4 is a flow chart illustrating steps of an embodiment of the navigation method according to this disclosure.

FIG. 4 shows a flow chart illustrating steps of the embodiment of the navigation method according to this disclosure. Further referring to FIGS. 1 and 2, the embodiment of the navigation method is proposed to compute and display, for each of the follower members, a respective dynamic navigation path from a position of the follower member to a position of the leader member in real time, based on the real-time position datasets provided by the portable devices 6a, 6b, 6c. Accordingly, the follower member or follower members need not set the destination on his/her/their portable device(s) and can still arrive at the destination by following the leader member. Even if the drivers in the group cannot see each other en route, they can still know at least the position of the leader member, and all the drivers of the group can get together easily based on the corresponding dynamic navigation paths.

In step S91, the portable devices 6a, 6b, 6c are operated by the leader member and the follower members to execute the respective APPs 621 for establishing, via a network (e.g., the Internet 8), a device group that includes the portable devices 6a, 6b, 6c, with the portable device 6a set to serve as a leader device and the portable devices 6b and 6c set to serve as follower devices.

In one implementation, the leader member may operate the portable device 6a to issue an electronic invitation to the portable devices 6b, 6c via the APP 621 executed by the portable device 6a for inviting the portable devices 6b, 6c to cooperatively establish the device group. Then, each of the follower members may operate the corresponding portable device 6b, 6c to accept the electronic invitation via the APP 621 executed by the portable device 6b, 6c, so as to cooperate with the portable device 6a to establish the device group. Since the electronic invitation is issued by the portable device 6a, the portable device 6a serves as the leader device after the device group is established.

In one implementation, the leader member may operate the portable device 6a to create the device group in which the portable device 6a is the leader device via the APP 621 executed by the portable device 6a. Each of the follower members may operate the corresponding portable device 6b, 6c to search for the device group created by the portable device 6a via the APP 621 executed by the portable device 6b, 6c. After the portable device 6b, 6c finds the device group, the follower member may operate the portable device 6b, 6c to issue an electronic request to the portable device 6a via the APP 621 executed by the portable device 6b, 6c for requesting permission to join the device group. After the portable device 6a receives the electronic request issued by the portable device 6b, 6c, the leader member may operate the portable device 6a to respond to the electronic request by permitting the portable device 6b, 6c to join the device group via the APP 621 executed by the portable device 6a.

In one implementation, the leader member may operate the portable device 6a to create the device group in which the portable device 6a is the leader device via the APP 621 executed by the portable device 6a. Then, the portable device 6a may display, via the APP 621 executed by the portable device 6a, a quick response code (QR code) relating to the device group created by the portable device 6a. Each of the follower members may operate the corresponding portable device 6b, 6c to scan the QR code via the image capturing unit 68 of the portable device 6b, 6c while using the APP 621 executed by the portable device 6b, 6c to join the device group.

It is noted that the APP 621 of each of the portable devices 6a, 6b, 6c is configured to allow the leader device to remove any of the follower device (s) from the device group upon receipt a user operation requesting to remove said follower device (s) from the device group.

However, the APP 621 is configured to not allow the follower device to remove any portable device from the device group.

In this embodiment, the APP 621 is further configured to allow, after the device group has been established, change of the leader device for the device group. In one implementation, the current leader device, which is exemplified as the portable device 6a shown in FIG. 2, may be operated by the current leader member to issue, to one of the follower devices, which are exemplified as the portable devices 6b, 6c shown in FIG. 2, a request for changing the leader device, via the APP 621 executed by the portable device 6a. Then, any one of the current follower members may operate the corresponding portable device 6b, 6c to issue a request for becoming the leader device to the portable device 6a in response to the request for changing the leader device via the APP 621 executed by the portable device 6b, 6c. After the portable device 6a receives the request for becoming the leader device issued by one of the portable devices 6b, 6c, the current leader member may operate the portable device 6a to accept the request for becoming the leader device via the APP 621 executed by the portable device 6a, so as to cause said one of the portable devices 6b, 6c which issued the request for becoming the leader device to serve as the leader device, and to cause the portable device 6a to serve as a follower device. In one implementation, any one of the follower devices, which are exemplified as the portable device 6b, 6c shown in FIG. 2, may be operated to issue, to the current leader device, which is exemplified as the portable device 6a shown in FIG. 2, a request for changing the leader device via the APP 621 executed by the portable device 6b, 6c. The current leader member may operate the portable device 6a to accept the request for changing the leader device via the APP 621 executed by the portable device 6a, so as to cause the portable device 6b, 6c, which issued the request for changing the leader device, to serve as the leader device, and to cause the portable device 6a to serve as a follower device.

Referring to FIGS. 1, 2 and 4, in step S92, the leader member operates the APP 621 executed by the portable device 6a, which serves as the leader device, to input a navigation destination, and to transmit the navigation destination to the map-and-information system 71. The map-and-information system 71 thus computes data for a static navigation path from the real-time position of the leader device (i.e., the portable device 6a in this example) to the destination, and provides the data for the static navigation path to the portable device 6a. It is noted that step S92 may be omitted in other embodiments since the main purpose of this disclosure is to provide, for each follower device, the dynamic navigation path from the real-time position of the follower device to the real-time position of the leader device. As long as the leader member knows how to arrive at the destination, provision of the static navigation path by the leader device is not necessary.

In step S93, for each of the follower devices, the map-and-information system 71 computes, based on the real-time positioning dataset corresponding to the leader device and the real-time positioning dataset corresponding to the follower device, data for the dynamic navigation path from the real-time position of the follower device to the real-time position of the leader device, data for a route screen that indicates the dynamic navigation path and a relative relationship between the real-time position of the leader device and the real-time position of the follower device, and/or data for a navigation screen that suggests a next driving behavior (e.g., changing a lane of driving, a next intersection to turn, etc.) for directing the follower device toward the leader device). Since many conventional algorithms that are known to one having ordinary skills in the art can be used for computation of a path between two locations of which positioning datasets (e.g., the GPS coordinates) have been identified, details thereof are omitted herein for the sake of brevity. In this embodiment, both of the route screen and the navigation screen indicate the dynamic navigation path (i.e., both of the data for the route screen and the data for the navigation path include the data for the dynamic navigation path), but may display the dynamic navigation path in different formats. It is noted that the route screen for each follower device may further show a relationship of a relative position between the follower device and another follower device (or each of the other follower device(s)), which can be computed further based on the real-time positioning dataset corresponding to said another follower device (or each of the other follower device(s)), but this disclosure is not limited in this respect.

In this embodiment, the map-and-information system 71 computes, for the portable device 6b (one of the follower devices) and based on the real-time positioning datasets respectively corresponding to the portable device 6a (the leader device) and the portable device 6b, data for a first dynamic navigation path from the real-time position of the portable device 6b to the real-time position of the portable device 6a, data for a first route screen that indicates the first dynamic navigation path and a relative relationship between the real-time positions of the portable devices 6a, 6b, and data for a first navigation screen that directs the portable device 6b toward the portable device 6a. In addition, the map-and-information system 71 also computes, for the portable device 6c (another one of the follower devices) and based on the real-time positioning datasets respectively corresponding to the portable devices 6a and 6c, data for a second dynamic navigation path from the real-time position of the portable device 6c to the real-time position of the portable device 6a, data for a second route screen that indicates the second dynamic navigation path and a relative relationship between the real-time positions of the portable devices 6a, 6c, and data for a second navigation screen that directs the portable device 6c toward the portable device 6a.

In step S94, the map-and-information system 71 provides, to each of the follower device(s), the corresponding data for the route screen and/or the corresponding data for the navigation screen. In this embodiment, the map-and-information system 71 provides the data for the first route screen and the data for the first navigation screen to the portable device 6b, and provides the data for the second route screen and the data for the second navigation screen to the portable device 6c. In one variation, the map-and-information system 71 may further provide the data for the first route screen and the data for the second route screen to the portable device 6a, so that the leader member may be aware of the real-time positions of the follower members relative to the real-time position of himself or herself.

In step S95, each of the follower device (s) provides the data for the route screen and/or the data for the navigation screen received in step S94 to the instrument cluster device 5 of the vehicle 1 that corresponds to the follower device. In this embodiment, the portable device 6b provides the data for the first route screen and the data for the first navigation screen to the instrument cluster device 5b of the vehicle 1b, and the portable device 6c provides the data for the second route screen and the data for the second navigation screen to the instrument cluster device 5c of the vehicle 1c. In the abovementioned variation, the portable device 6a also provides the data for the first route screen and the data for the second route screen to the instrument cluster device 5a of the vehicle 1a. In step S96, for each of the follower device(s), the instrument cluster device 5 of the vehicle 1 that corresponds to the follower device perceivably outputs the dynamic navigation path (i.e., in a manner perceivable by a user (e.g., the follower member)) based on the data for the dynamic navigation path to the follower member using the follower device. In one implementation, for each of the follower device(s), the instrument cluster device 5 of the vehicle 1 that corresponds to the follower device displays the route screen and/or the navigation screen using the host display 50 thereof based on the data for the route screen and the data for the navigation screen, which are received in step S95. In this embodiment, the instrument cluster device 5b of the vehicle 1b displays the first route screen and the first navigation screen using the host display 50b, and the instrument cluster device 5c of the vehicle 1c displays the second route screen and the second navigation screen using the host display 50c.

Figure 5:
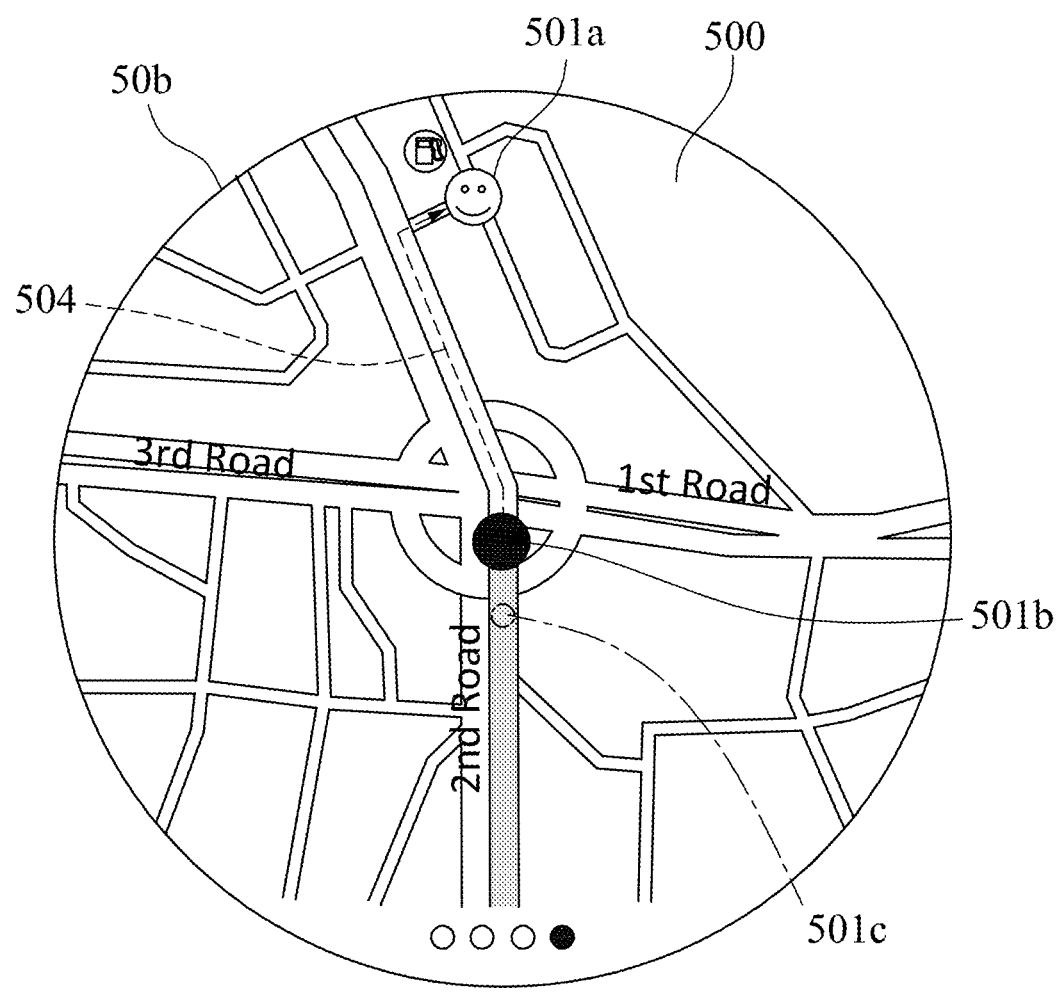
FIG. 5 is a schematic diagram exemplarily showing a route screen provided using the navigation method.

FIG. 5 exemplarily shows a route screen 500 that is displayed by the host display 50b of the instrument cluster device 5b. The route screen 500 includes a circular map zone that fits a shape of the host display 50b, that shows an area in a vicinity of the portable device 6b (i.e., the corresponding follower device) in a predetermined scale, and that has a center corresponding to the real-time position of the portable device 6b. The route screen 500 shows a follower mark 501b (e.g., represented by a big solid circle) that represents the real-time position of the portable device 5b at the center of the circular map zone. The route screen 500 may further show additional information relating to an area corresponding to the circular map zone (e.g., information of shops, gas stations, parking lots, etc. within the area), which is defined by a radius of the circular zone. When a distance between the real-time position of the leader device (e.g., the portable device 6a) and the real-time position of the corresponding follower device (e.g., the portable device 6b) is not greater than a distance corresponding to the radius of the circular map zone, the route screen 500 further shows, as exemplified in FIG. 5, a leader mark 501a (e.g., represented by a mark of a smiley face) that is different from the follower mark 501b and that represents the real-time position of the leader device in the circular map zone, and the dynamic navigation path 504 shown in the route screen 500 connects the leader mark 501a and the follower mark 501b. When a distance between the real-time position of the corresponding follower device and the real-time position of another follower device (e.g., the portable device 6c) is not greater than the distance corresponding to the radius of the circular map zone, the route screen 500 further shows, as exemplified in FIG. 5, an auxiliary follower mark 501c (e.g., represented by a small hollow circle) that is different from both the leader mark 501a and the follower mark 501b and that represents the real-time position of the portable device 6c in the circular map zone. For example, assuming that the radius of the circular map zone corresponds to two kilometers, it can be known from FIG. 5 that both of the distance between the portable devices 5a, 5b and the distance between the portable devices 5b, 5c are less than two kilometers. By the different designs of the leader mark 501a, the follower mark 501b, and the auxiliary follower mark 501c, the follower member using the portable device 6b may easily identify the relative position between the portable device 6b and each of the portable devices 6a, 6c.

The route screen 500 may show other information in addition to those mentioned above for the user to check, so the route screen 500 may be relatively more suitable for use under a low vehicle speed condition (e.g., lower than 20 km/hr). For example, when the vehicle 1b is stopped at a red traffic light, the driver may operate a physical button (not shown) that is electrically connected to the instrument cluster device 5b to switch the host display 50b from a navigation mode in which the navigation screen (as exemplified by a reference numeral 505 in FIG. 7) is displayed to a group mode in which the route screen 500 is displayed.

Figure 8:
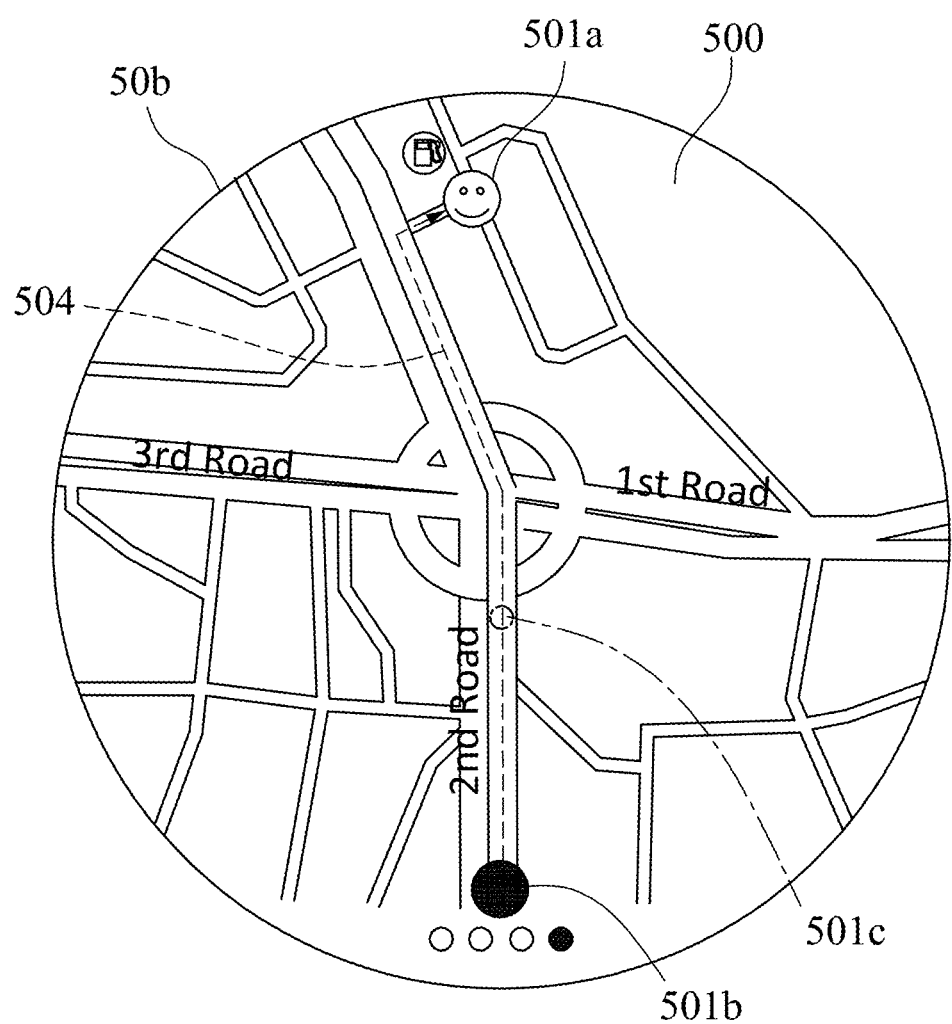
FIG. 8 is schematic diagram exemplarily showing a route screen provided using the navigation method in another format.

FIG. 8 shows a variation of the route screen 500. In this variation, the follower mark 501b is set to a location other than the center of the circular map zone. For example, the follower mark 501b is set to a location proximate to a periphery of the circular map zone.

Figure 7:
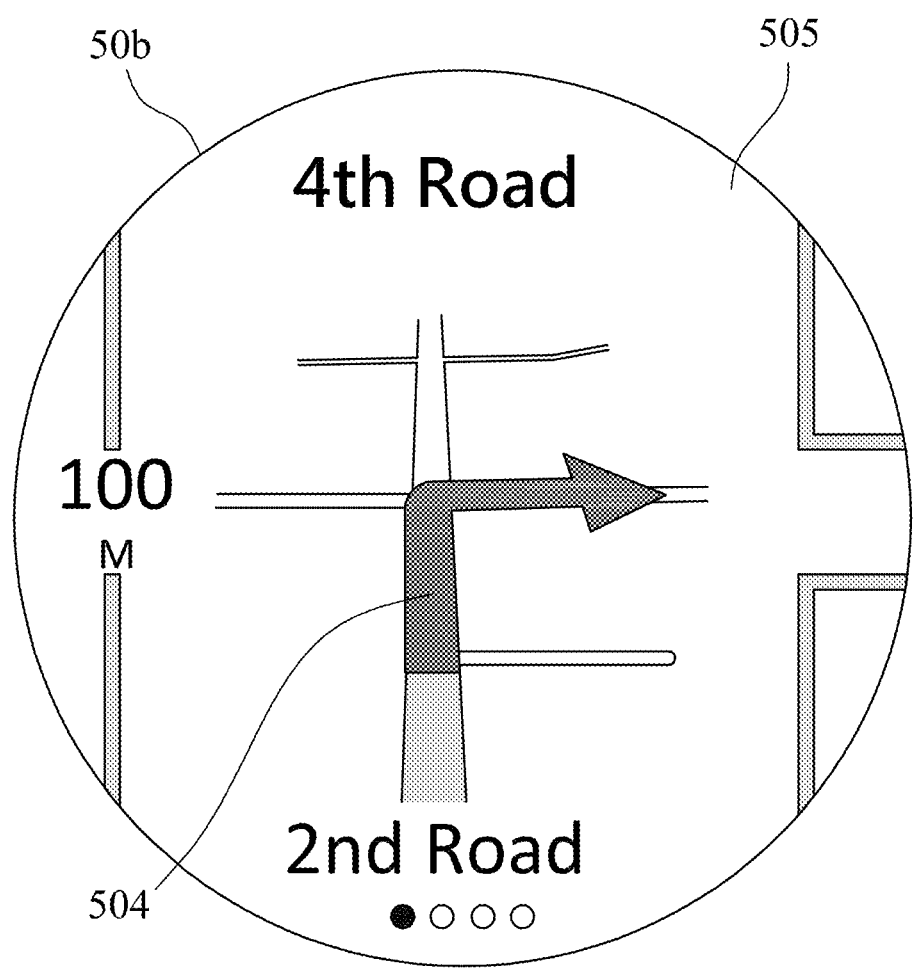
FIG. 7 is a schematic diagram exemplarily showing a navigation screen provided using the navigation method.

In the group mode, when the portable device 5b is away from the portable device 5a so far that the leader mark 501a disappears from the circular map zone, the follower member using the portable device 5b can still catch up to the leader member by following the dynamic navigation path 504. The follower member using the portable device 5b may also operate a physical button that is electrically connected to the instrument cluster device 5b to switch the host display 50b from the group mode to the navigation mode. As shown in FIG. 7, although the navigation screen 505 does not show the leader mark 501a (see FIGS. 5 and 8), the navigation screen 505 includes a circular map zone that covers an area in a vicinity of the portable device 5b in a scale that is greater than the predetermined scale for the route screen 500 (see FIGS. 5 and 8). That is, the navigation screen 505 displays a smaller map area than the route screen 500 with the same display area (i.e., the circular map zone), so that the navigation screen 505 can provide the navigation information in more detail than the route screen 500. For example, in addition to the dynamic navigation path 504, the navigation screen 505 may further instruct the follower member using the portable device 5b to turn right 100 meters (see "100M" in FIG. 7) ahead to enter the Fourth Road.

Figure 6:
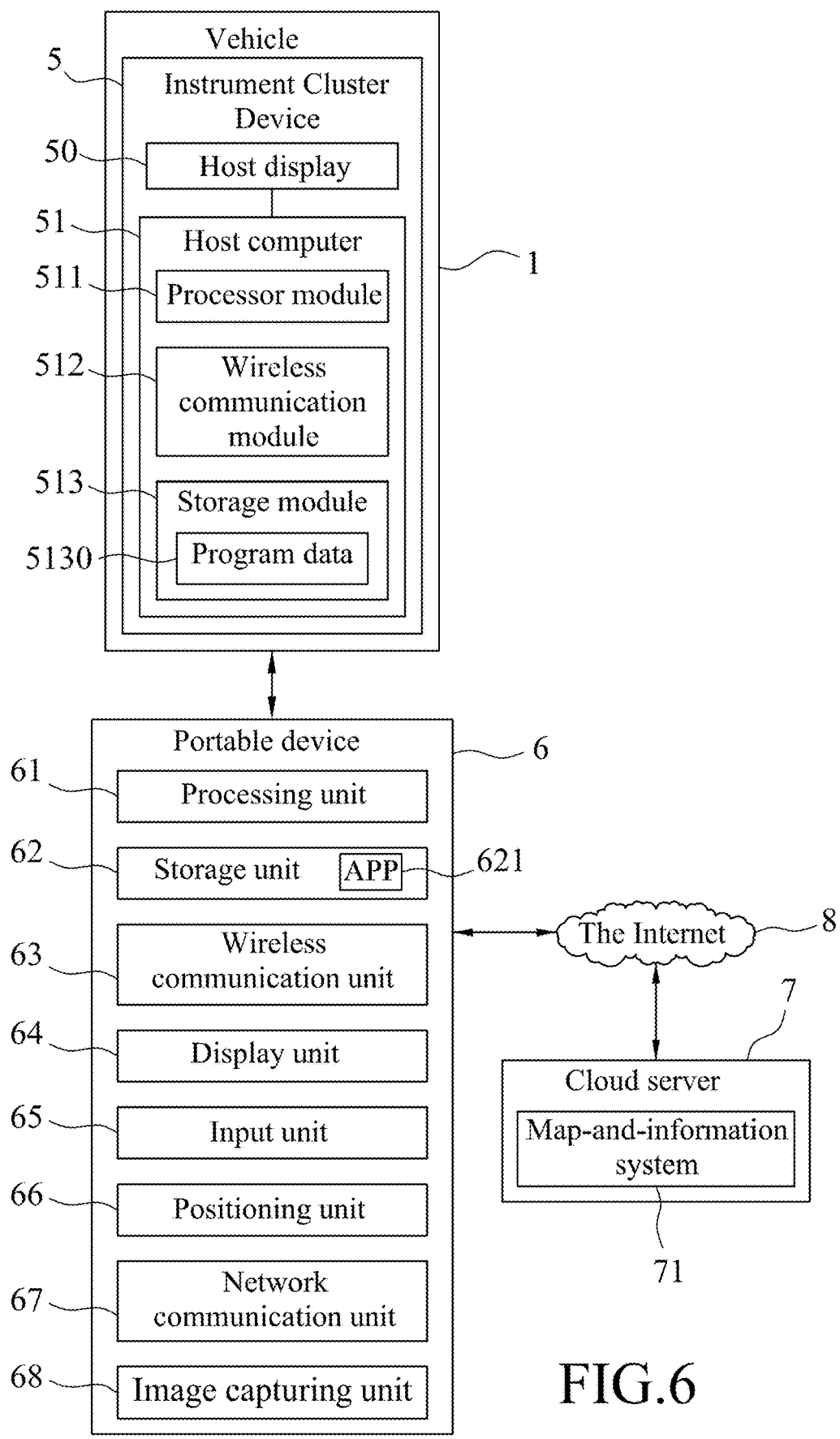
FIG. 6 is a block diagram illustrating a variation of the instrument cluster device.

FIG. 6 shows a variation of the instrument cluster device 5 of the vehicle 1. In this variation, the instrument cluster device 5 includes only the host display 50 and the host computer 51 that perform all functions of the dashboard 52 and the dashboard controller 53 of the embodiment shown in FIG. 1, and the dashboard 52 and the dashboard controller 53 are omitted.

Figure 9:
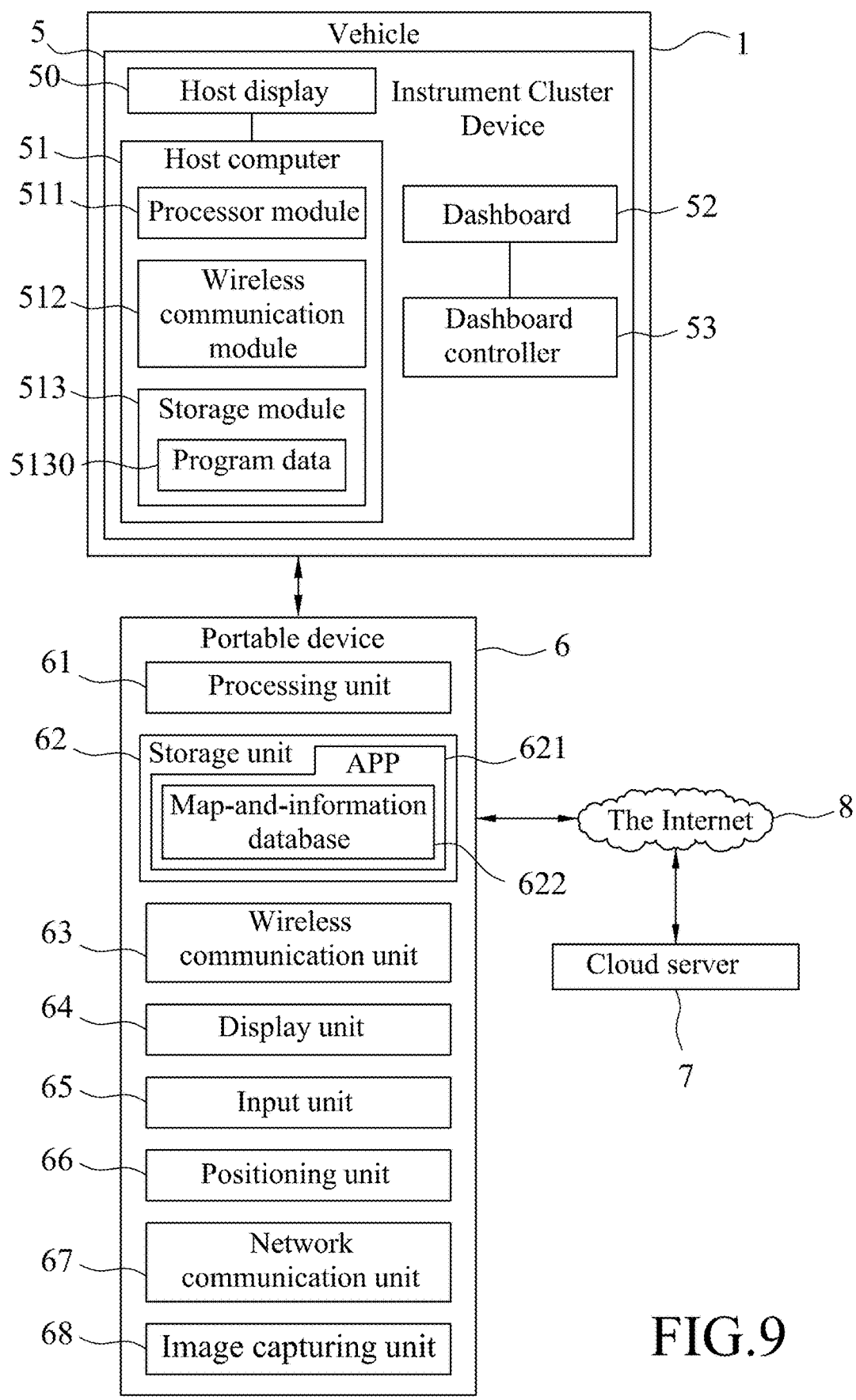
FIG. 9 is a block diagram illustrating a variation of the portable device and the map-and-information system for the navigation system in comparison to FIG. 1.

FIG. 9 shows a variation of the navigation system, which differs from that shown in FIG. 1 in that the APP 621 of the portable device 6 includes a map-and-information database 622, and the map-and-information system in this variation refers to, for each of the portable devices 6 in the device group, the processing unit 61 thereof when the processing unit 61 executes the APP 621. In such implementation, the portable devices 6 in the device group may transfer the real-time positioning datasets to each other for computation of the dynamic navigation path, the route screen and the navigation screen. The map-and-information database 622 may be updated by the processing unit 61 that executes the APP 621 downloading the latest version of the map-and-information data from the cloud server 7 via the Internet 8.

Figure 10:
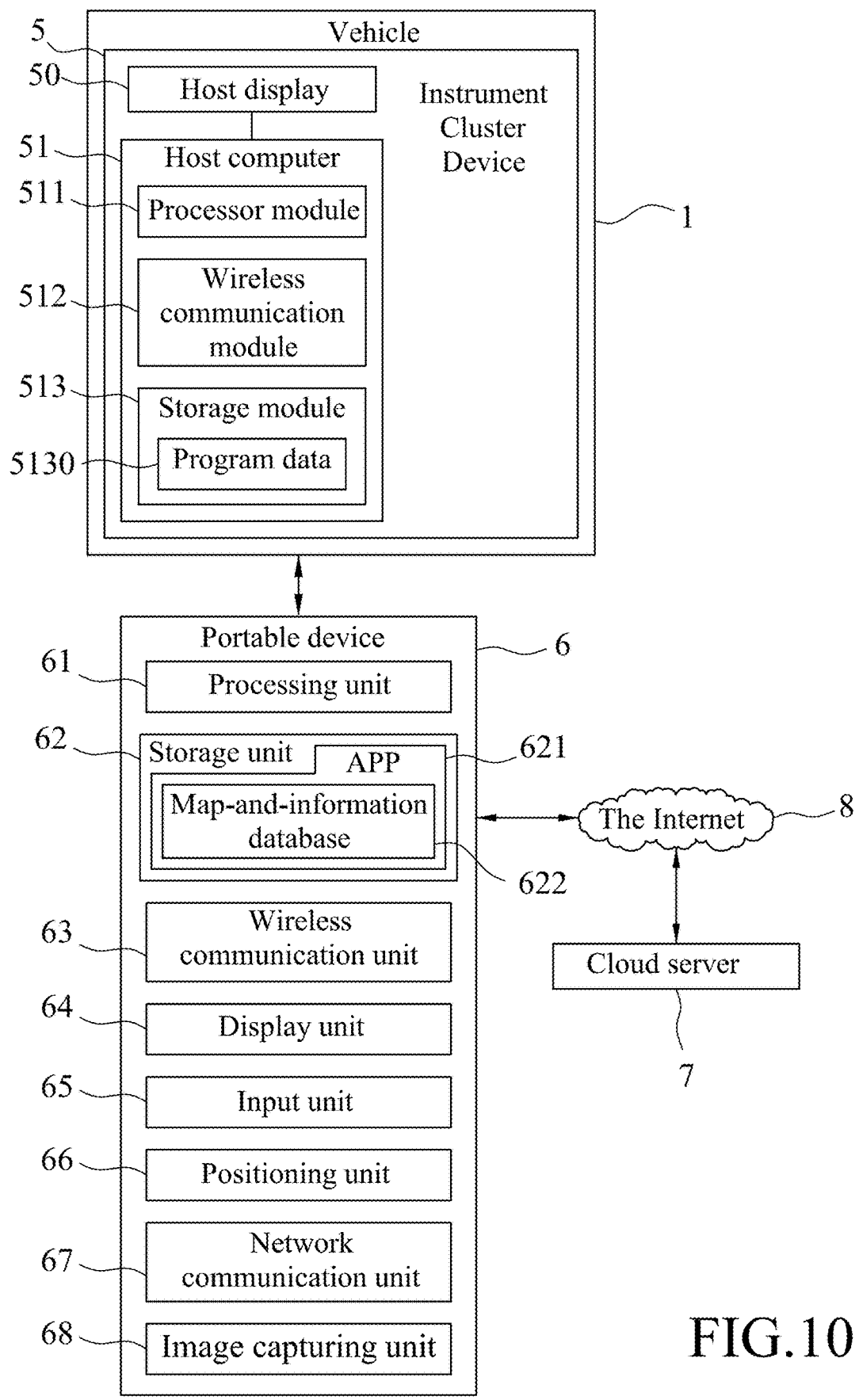
FIG. 10 is a block diagram illustrating a variation of the portable device and the map-and-information system for the navigation system in comparison to FIG. 6.

FIG. 10 shows a variation of the navigation system, which differs from that shown in the FIG. 6 in that the APP 621 of the portable device 6 includes a map-and-information database 622, and the map-and-information system in this variation refers to, for each of the portable devices 6 in the device group, the processing unit 61 thereof when the processing unit 61 executes the APP 621. The map-and-information database 622 may be updated by the processing unit 61 that executes the APP 621 downloading the latest version of the map-and-information data from the cloud server 7 via the Internet 8.

It is noted that it is not necessary for the map-and-information system to frequently refresh the data for the dynamic navigation path, the route screen or the navigation screen for each follower device, but only do so periodically at predetermined time intervals (e.g., from thirty seconds to one minute), so as to save power consumed by the follower device(s) in processing the data for navigation.

In summary, the embodiments of this disclosure use the map-and-information system to compute, for each of the follower device(s), data for the dynamic navigation path, the route screen, and/or the navigation screen based on the real-time position datasets corresponding to the leader device and the follower device, followed by providing the computed data to the follower device, so that the host display of the instrument cluster device can display the route screen and/or the navigation screen that indicate the dynamic navigation path. As a result, the follower member(s) can arrive the destination by following the leader member and without setting the destination in the corresponding portable device. Even if the members in the group cannot see each other during driving, they can still know at least the position of the leader member, and all the drivers of the group can get together easily based on the corresponding dynamic navigation path.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A navigation method, comprising:
A) providing a plurality of portable devices, each of the portable devices having a positioning function to generate a real-time position dataset that indicates a real-time position thereof, being communicatively coupled to an instrument cluster device of a respective one of vehicles, and being associated with a map-and-information system;
B) establishing, via a network and by the portable devices each of which executes an application program, a device group including a leader device and at least one follower device, wherein a first one of the portable devices is set to serve as the leader device, and each of the portable devices that is other than the first one of the portable devices is set to serve as one of the at least one follower device;
C) computing, by the map-and-information system and based on a real-time positioning dataset corresponding to the leader device and a real-time positioning dataset corresponding to the at least one follower device, data for a dynamic navigation path from the real-time position of the at least one follower device to the real-time position of the leader device; and D) perceivably outputting, by the instrument cluster device of one of the vehicles that corresponds to the at least one follower device, the dynamic navigation path based on the data for the dynamic navigation path.

2. The navigation method of claim 1, wherein the map-and-information system is included in a cloud server and corresponds to each of the portable devices in the device group, and step C) further includes: computing, by the map-and-information system, data for a route screen that indicates the dynamic navigation path and a relative relationship between the real-time position of the leader device and the real-time position of the at least one follower device;

said navigation method further comprising, after step C):
providing, by the map-and-information system, the data for the route screen to the at least one follower device; and
providing, by the at least one follower device, the data for the route screen to the instrument cluster device of said one of the vehicles that corresponds to the at least one follower device;
wherein step D) includes: displaying, by the instrument cluster device of said one of the vehicles that corresponds to the at least one follower device, the route screen based on the data for the route screen.

3. The navigation method of claim 2, wherein the route screen includes a circular map zone that shows an area in a vicinity of the at least one follower device in a predetermined scale, and that has a center corresponding to the real-time position of the at least one follower device;
wherein the route screen shows a follower mark that represents the real-time position of the at least one follower device at the center of the circular map zone;
wherein the route screen further shows a leader mark that is different from the follower mark and that represents the real-time position of the leader device in the circular map zone when a distance between the real-time position of the leader device and the real-time position of the at least one follower device is not greater than a distance corresponding to a radius of the circular map zone; and
wherein the dynamic navigation path shown in the route screen connects the leader mark and the follower mark.

4. The navigation method of claim 1, further comprising, after step B):
by the leader device which is the first one of the portable devices, in response to a user operation, and via the application program executed by the leader device, issuing, to each of the at least one follower device, a request for changing the leader device;
by one of the at least one follower device which is a second one of the portable devices, in response to a user operation and via the application program executed by the second one of the portable devices, issuing a request for becoming the leader device to the first one of the portable devices in response to the request for changing the leader device; and
accepting, by the leader device, the request for becoming the leader device via the application program executed by the leader device, so as to cause the second one of the portable devices to serve as the leader device, and to cause the first one of the portable devices to serve as one of the at least one follower device.

5. The navigation method of claim 1, further comprising, after step B):
by one of the at least one follower device which is a second one of the portable devices, in response to a user operation and via the application program executed by the second one of the portable devices, issuing, to the leader device, a request for changing the leader device; and
accepting, by the leader device which is the first one of the portable devices, in response to a user operation and via the application program executed by the leader device, the request for changing the leader device, so as to cause the second one of the portable devices to serve as the leader device, and to cause the first one of the portable devices to serve as one of the at least one follower device.

6. A navigation system, comprising:
a plurality of portable devices, each of which has a positioning function to generate a real-time position dataset that indicates a real-time position thereof, is communicatively coupled to an instrument cluster device of a respective one of vehicles, each of said portable devices executing an application program to establish, via a network, a device group including a leader device and at least one follower device, wherein a first one of the portable devices is set to serve as the leader device, and each of said portable devices that is other than the first one of said portable devices is set to serve as one of said at least one follower device; and
a map-and-information system configured
to receive the real-time positioning dataset corresponding to said leader device and the real-time positioning dataset corresponding to said at least one follower device, and
to compute, based on the real-time positioning dataset corresponding to said leader device and the real-time positioning dataset corresponding to said at least one follower device, data for a dynamic navigation path from the real-time position of said at least one follower device to the real-time position of said leader device;
wherein said at least one follower device is configured to receive the data for the dynamic navigation path from said map-and-information system, and to cause the instrument cluster device of one of the vehicles that corresponds to said at least one follower device to perceivably output the dynamic navigation path based on the data for the dynamic navigation path.

7. The navigation system of claim 6, further comprising said instrument cluster device of said vehicle which is communicatively coupled to said at least one follower device via one of a wired connection and a wireless communication;
wherein said map-and-information system is included in a cloud server, and is configured to compute data for a route screen that indicates the dynamic navigation path and a relative relationship between the real-time position of said leader device and the real-time position of said at least one follower device;
wherein said map-and-information system is configured to provide the data for the route screen to said at least one follower device;
wherein said at least one follower device is configured to provide the data for the route screen to said instrument cluster device of the vehicle that corresponds to said at least one follower device; and wherein said instrument cluster device of the vehicle that corresponds to said at least one follower device is configured to display the route screen based on the data for the route screen.

8. The navigation system of claim 7, wherein the route screen includes a circular map zone that shows an area in a vicinity of said at least one follower device in a predetermined scale, and that has a center corresponding to the real-time position of said at least one follower device;
wherein the route screen shows a follower mark that represents the real-time position of said at least one follower device at the center of the circular map zone;
wherein the route screen further shows a leader mark that is different from the follower mark and that represents the real-time position of said leader device in the circular map zone when a distance between the real-time position of said leader device and the real-time position of said at least one follower device is not greater than a distance corresponding to a radius of the circular map zone; and
wherein the dynamic navigation path shown in the route screen connects the leader mark and the follower mark.

9. The navigation system of claim 6, wherein said leader device, which is the first one of said portable devices, is operable to issue, to each of said at least one follower device, a request for changing the leader device via the application program executed thereby;
wherein each of said at least one follower device is operable to issue a request for becoming the leader device to the first one of said portable devices in response to the request for changing the leader device via the application program executed thereby; and
wherein said leader device is operable to accept, via the application program executed thereby, the request for becoming the leader device issued by one of said at least one follower device which is a second one of said portable devices, so as to cause the second one of said portable devices to serve as said leader device, and to cause the first one of said portable devices to serve as one of said at least one follower device.

10. The navigation system of claim 6, wherein each of said at least one follower device is operable to issue, to said leader device, a request for changing the leader device via the application program executed thereby; and
said leader device, which is the first one of said portable device, is operable to accept, via the application program executed thereby, the request for changing the leader device issued by one of said at least one follower device which is a second one of said portable devices, so as to cause the second one of said portable devices to serve as said leader device, and to cause the first one of said portable devices to serve as one of said at least one follower device.

* * * * *